US011999169B2

(12) United States Patent
Kawagoe

(10) Patent No.: US 11,999,169 B2
(45) Date of Patent: Jun. 4, 2024

(54) LIQUID CONTAINER AND RECORDING APPARATUS

(71) Applicant: Brother Kogyo Kabushiki Kaisha, Nagoya (JP)

(72) Inventor: Masako Kawagoe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 186 days.

(21) Appl. No.: 17/572,897

(22) Filed: Jan. 11, 2022

(65) Prior Publication Data

US 2022/0134765 A1 May 5, 2022

Related U.S. Application Data

(63) Continuation of application No. 17/121,991, filed on Dec. 15, 2020, now Pat. No. 11,247,476, which is a continuation of application No. 16/574,326, filed on Sep. 18, 2019, now Pat. No. 10,875,315.

(30) Foreign Application Priority Data

Sep. 28, 2018 (CN) ........................ 201821589328.1

(51) Int. Cl.
*B41J 2/175* (2006.01)

(52) U.S. Cl.
CPC ....... *B41J 2/17506* (2013.01); *B41J 2/17553* (2013.01)

(58) Field of Classification Search
CPC . B41J 2/17503; B41J 2/17553; B41J 2/17513
See application file for complete search history.

(56) References Cited

U.S. PATENT DOCUMENTS 9,079,413 B2 7/2015 Kudo et al.
2017/0282573 A1 10/2017 Hayashi
2018/0345673 A1 * 12/2018 Shirono ............... B41J 2/17506

FOREIGN PATENT DOCUMENTS

JP 2017-081059 A 5/2017

* cited by examiner

*Primary Examiner* — Jason S Uhlenhake
(74) *Attorney, Agent, or Firm* — KENEALY VAIDYA LLP

(57) ABSTRACT

A liquid container includes a liquid chamber defined by an upper wall, a lower wall, and a peripheral wall, a refill port, a liquid outlet port through which ink is supplied from the liquid chamber to the outside, and a first longitudinal partition extending upward from the lower wall and configured to partition the liquid chamber into a first liquid containing portion and a second liquid containing portion in a horizontal direction. A first lateral communication passage is positioned between an end portion of the first longitudinal partition in the horizontal direction and the peripheral wall. The liquid outlet port is disposed in one of the first liquid containing portion and the second liquid containing portion.

13 Claims, 9 Drawing Sheets

B-B

LIQUID CONTAINER AND RECORDING APPARATUS

CROSS-REFERENCE TO RELATED APPLICATION

This application is a continuation application of U.S. patent application Ser. No. 17/121,991, filed Dec. 15, 2020, which is a continuation application of U.S. patent application Ser. No. 16/574,326, filed Sep. 18, 2019 and claims priority under 35 U.S.C. § 119 from Chinese Utility Model Application No. 201821589328.1, filed on Sep. 28, 2018, the entireties of which are incorporated herein by reference,

TECHNICAL FIELD

Aspects disclosed herein relates to a liquid container and a recording apparatus including the liquid container.

BACKGROUND

Known inkjet printers include a liquid container that contains ink, that is, an ink tank. Ink tanks that can be refilled with ink are also applied to inkjet printers. Some ink may be prone to be agglomerated and precipitated, thus, such ink may non-uniformly precipitate in the ink tank. This may affect the printed image.

SUMMARY

According to the one or more aspects of the disclosure, a liquid container may include a liquid chamber, a refill port, a liquid outlet port, and a first longitudinal partition. The liquid chamber may be configured to contain liquid and defined by an upper wall, a lower wall, and a peripheral wall. The refill port may be positioned in the upper wall. Ink may be supplied from the liquid chamber to the outside through the liquid outlet port. The first longitudinal partition may extend upward from the lower wall and may be configured to partition the liquid chamber into a first liquid containing portion and a second liquid containing portion in a horizontal direction. A first lateral communication passage configured to communicate the first liquid containing portion with the second liquid containing portion may be positioned between an end portion of the first longitudinal partition in the horizontal direction and the peripheral wall. The liquid outlet port may be disposed in one of the first liquid containing portion and the second liquid containing portion.

According to the one or more other aspects of the disclosure, an ink cartridge may include an ink chamber, an ink inlet port, an ink outlet port, a first partition, and a second partition. The ink chamber may be configured to contain ink and defined by at least an upper wall, a lower wall, a first side wall and a second side wall. The ink inlet port may be provided in the upper wall. The ink outlet port may be provided in the lower wall. The first partition may extend upward from the lower wall. The second partition may extend horizontally between the first side wall and the second side wall and be located above the first partition. The second partition may include a through-hole communicating an upper space above the second partition in the ink chamber with a lower space below the second partition in the ink chamber. The first partition may be located such that a passage is defined between the first partition and the first side wall, whereby the first partition divides the lower space into a first lower space and a second lower space. The ink outlet port may be located at one of the first lower space and the second lower space.

According to the one or more other aspects of the disclosure, a recording apparatus may include a liquid container and a recording head. The recording head may be configured to eject liquid supplied from the liquid container and perform recording.

BRIEF DESCRIPTION OF THE DRAWINGS

Aspects of the disclosure are illustrated by way of example and not by limitation in the accompanying figures in which like reference characters indicate similar elements.

FIG. 3A shows a case of the first embodiment. FIGS. 3B and 3C each shows a case of other embodiments.

DETAILED DESCRIPTION

Hereinafter, an illustrative embodiment will be described with reference to the accompanying drawings.

First Embodiment

Figure 1:
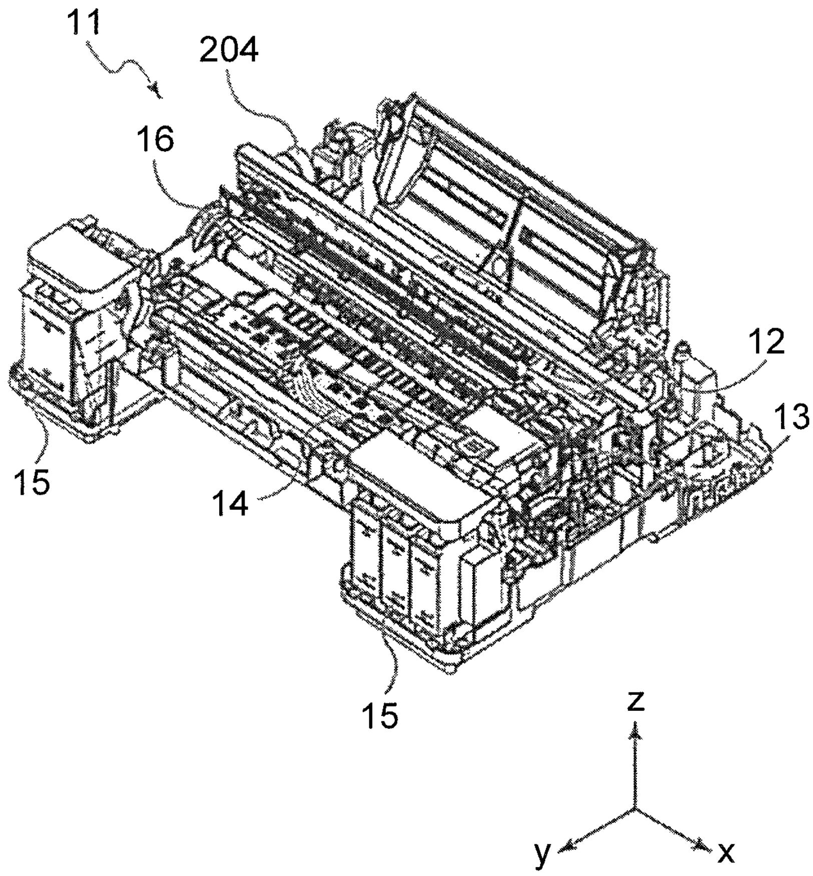
FIG. 1 is a perspective view illustrating a main configuration of a recording apparatus in a first embodiment of the disclosure.

FIG. 1 is a perspective view illustrating a main configuration of a recording apparatus in a first embodiment of the disclosure. As illustrated in FIG. 1, for convenience of explanation, coordinate system is set as follows: an x-axis direction, a y-axis direction, and a z-axis direction orthogonal to the x-axis direction and the y-axis direction. Such coordinate system is similarly set in other drawings.

As illustrated in FIG. 1, a recording apparatus 11 includes a recording head 13 held by a carriage 12, an ink supply path 14 for supplying ink from an ink tank 15 to the recording head 13, a paper feed roller, a conveying roller 16, a paper discharge roller, a carriage motor 204, and the like. In FIG. 1, a plurality of ink tanks 15 are disposed along the x-axis direction. One of the ink tanks 15 disposed in the negative direction (i.e., −x direction) in the x-axis direction accommodates ink of one color (for example, black). Other of the ink tanks 15 disposed in the positive direction (i.e., +x direction) each accommodates ink of different color (for example, cyan, magenta, and yellow).

Next, structure of the ink tank 15, which is examples of a liquid container and an ink cartridge, will be described.

Figure 2:
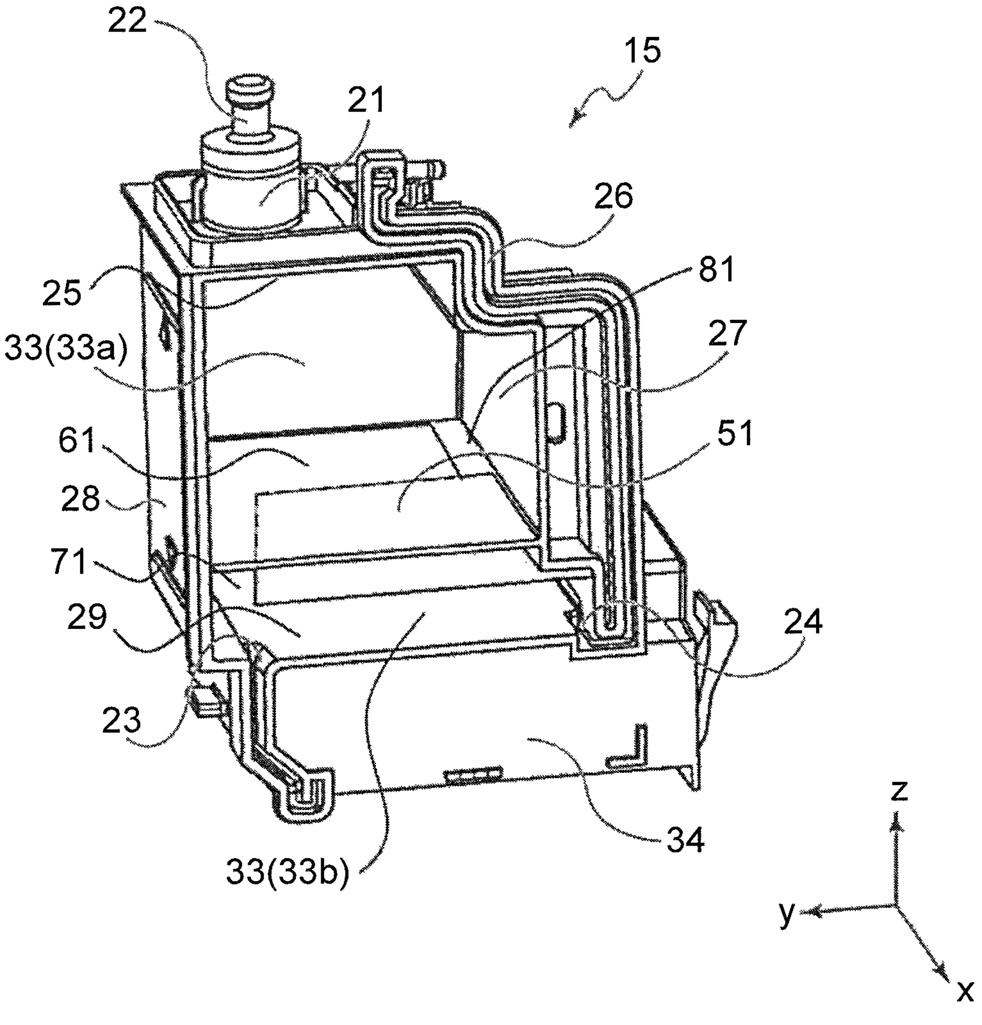
FIG. 2 is a perspective view illustrating an internal structure of the ink tank in the first embodiment of the disclosure.
Figure 3A:
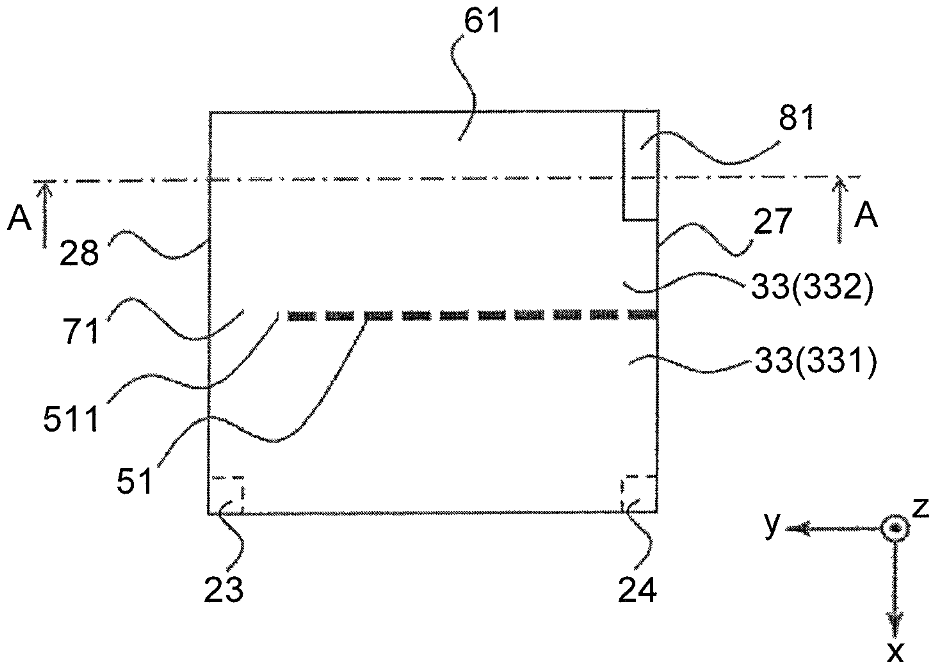
FIGS. 3A-3C are top views schematically illustrating of a first lateral partition as viewed from above.
Figure 3B:
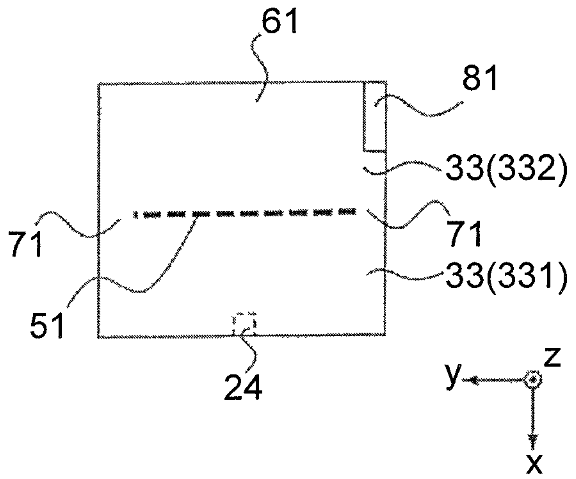
Figure 3C:
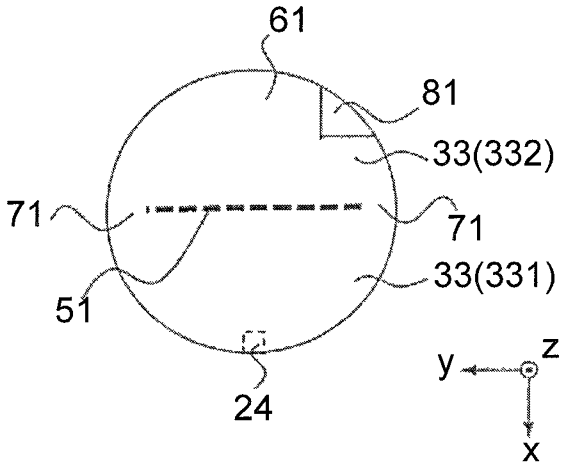
Figure 4:
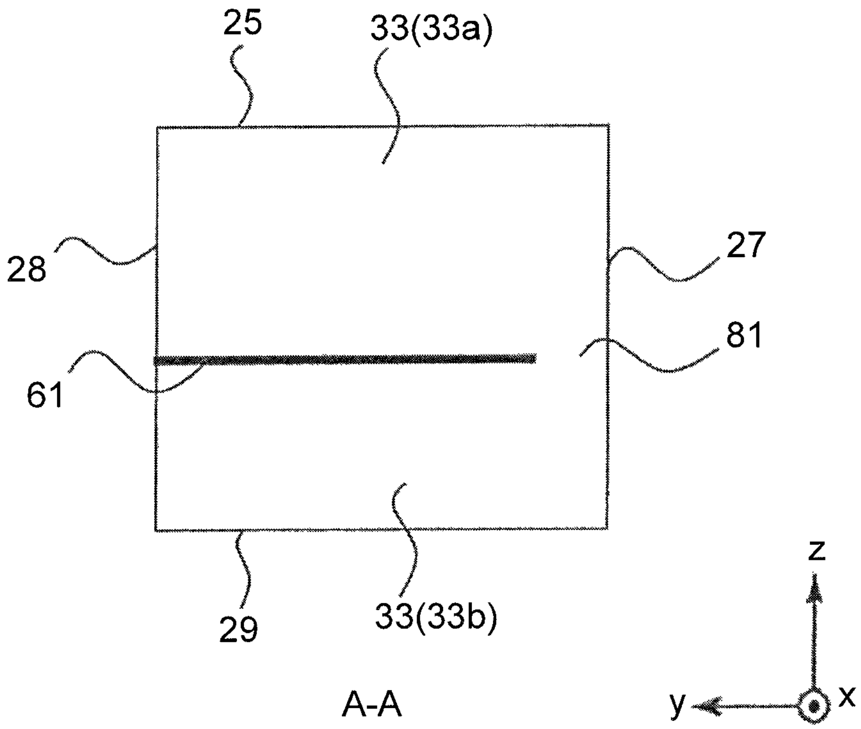
FIG. 4 is a cross-sectional view taken along a line A-A of FIG. 3A.

FIG. 2 is a perspective view illustrating an internal structure of the ink tank in the first embodiment of the disclosure. FIG. 2 shows a configuration of the ink tank 15 of the first embodiment in a use posture. FIGS. 3A-3C are top views schematically illustrating of a first lateral partition (described below) as viewed from above. FIG. 4 is a cross-sectional view taken along a line A-A of FIG. 3A.

As illustrated in FIG. 2, an ink chamber 33 (as an example of a liquid chamber) is formed inside the ink tank 15. The ink chamber 33 is defined by peripheral walls including an upper wall 25, and a lower wall 29. The peripheral walls include also a film (not shown). In the first embodiment, as illustrated in FIGS. 2 and 3A-3B, the horizontal section of the ink chamber 33 is in a shape of a quadrangle. Therefore, the peripheral walls may further include two side walls, which are disposed to face each other in the x-axis direction, and a first side wall 27 and a second side wall 28, which are disposed to face each other in the y-axis direction. Therefore, the ink chamber 33 is surrounded by the upper wall 25, the lower wall 29, the first side wall 27, the second side wall 28, and the film. The film covers an opening which is defined by the upper wall 25, the lower wall 29, the first side wall 27, and the second side wall 28. An ink inlet port 21 communicating with the ink chamber 33 to allow the user to pour ink into the ink chamber 33 therethrough is formed in the upper wall 25. A cover 22 is detachably attached to the ink inlet port 21. A buffer chamber 34 for accommodating air is disposed below the lower wall 29, that is, disposed at a lower portion of the ink chamber 33. The buffer chamber 34 is provided with an atmosphere communication port. Thus, the lower wall 29 constitutes a part of a top wall of the buffer chamber 34.

Further, the lower wall 29 is formed with an air supply port 23 and an ink outlet port 24 (as an example of a liquid outlet port). The air supply port 23 communicates with the buffer chamber 34. Air is supplied from the buffer chamber 34 to the ink chamber 33 through the air supply port 23. Ink is supplied from the ink chamber 33 to the outside (that is, toward the ink supply path 14) via the ink flow path 26 through the ink outlet port 24. The air supply port 23 and the ink outlet port 24 are formed to be separated from each other in the lower wall 29. In the first embodiment, the air supply port 23 is formed at an end portion of the lower wall 29 in the positive direction of the y-axis direction (i.e., +y direction) and at an end portion of the lower wall 29 in the positive direction of the x-axis direction (i.e., +x direction). The ink outlet port 24 is formed at an end portion of the lower wall 29 in the negative direction of the y-axis direction (i.e., −y direction) and at an end portion of the lower wall 29 in the positive direction of the x-axis direction (i.e., +x direction).

As illustrated in FIGS. 2 and 3A—3C, the lower wall 29 is formed with a first longitudinal partition 51 extending upward from an upper surface of the lower wall 29. The first longitudinal partition 51 is configured to partition the ink chamber 33 into a first ink containing portion 331 (as an example of a first liquid containing portion) and a second ink containing portion 332 (as an example of a second liquid containing portion) in a horizontal direction, i.e., the x-axis direction. The first longitudinal partition 51 also extends from the first side wall 27, inward the ink chamber 33, toward the second side wall 28. A first lateral communication passage 71 configured to communicate the first ink containing portion 331 with the second ink containing portion 332 is defined between an end portion 511 of the first longitudinal partition 51 in a horizontal direction, i.e., the y-axis direction, and the second side wall 28. Thus, by providing the first longitudinal partition 51 to make the flow path of the ink longer, the thickness of the deposited sediment may be reduced, and as a result, the ink concentration may be made uniform.

The ink outlet port 24 may be disposed in one of the first ink containing portion 331 and the second ink containing portion 332. In the first embodiment, the ink outlet port 24 is disposed in the first ink containing portion 331. As illustrated in FIG. 3A, the ink outlet port 24 is positioned away from the first lateral communication passage 71 as compared with the end portion 511 of the first longitudinal partition 51 defining the first lateral communication passage 71. Thus, the length of the flow path of the ink flowing into the ink outlet port 24 in the ink chamber 33 may be long enough for reducing precipitation of a high concentration of ink on the upper surface of the lower wall 29.

Further, as illustrated in FIGS. 2, 3A-3C, and 4, a first lateral partition 61, which is configured to partition the ink chamber 33 into an upper ink containing portion 33*a* (as an example of an upper liquid containing portion) and a lower ink containing portion 33*b* (as an example of a lower liquid containing portion), is further provided above the first longitudinal partition 51. The lower ink containing portion 33*b* is partitioned by the first longitudinal partition 51 into the first ink containing portion 331 and the second ink containing portion 332. The first lateral partition 61 extends from the second side wall 28 inward the ink chamber 33. A first longitudinal communication passage 81 configured to communicate the lower ink containing portion 33*b* with the upper ink containing portion 33*a* is formed between the first lateral partition 61 and the first side wall 27. Thus, providing the first lateral partition 61 above the first longitudinal partition 51 may further lengthen the length of the flow path of the ink flowing into the ink outlet port 24 in the ink chamber 33.

Furthermore, the first longitudinal communication passage 81 is formed between one of the first ink containing portion 331 and the second ink containing portion 332, in which the ink outlet port 24 is not provided (in the first embodiment, the ink outlet port 24 is not provided in the second ink containing portion 332), and the upper ink containing portion 33*a*. Thus, the flow path of the ink flowing into the ink outlet port 24 in the ink chamber 33 may further extend.

As illustrated in FIG. 3A, the air supply port 23 is located closer to the first lateral communication passage 71 than the ink outlet port 24. Thus, the air supplied from the air supply port 23 may promote ink flowing in the vicinity of the first lateral communication passage 71, thereby uniformizing ink concentration. Then, the ink with uniform concentration flows toward the ink outlet port 24, and as a result, the ink supplied from the ink outlet port 24 to the outside may have enough uniform concentration.

In the first embodiment, the case where the first longitudinal partition 51 extends from the peripheral wall (i.e., the first side wall 27) into the ink chamber 33 has been described as an example, but not limited thereto, and the first longitudinal partition 51 may be disposed separately from the peripheral wall (refer to FIG. 3B). Besides, in the first embodiment, the case where the cross section of the ink chamber 33 in the horizontal direction is a quadrangular shape has been described as an example, but not limited thereto, and the cross section of the ink chamber 33 in the horizontal direction may be circular or elliptical (refer to FIG. 3C). In this regard, the same is true in the following embodiments.

The first embodiment has been described above, and modifications of the first embodiment will be described next.

First Modification of First Embodiment

Figure 5:
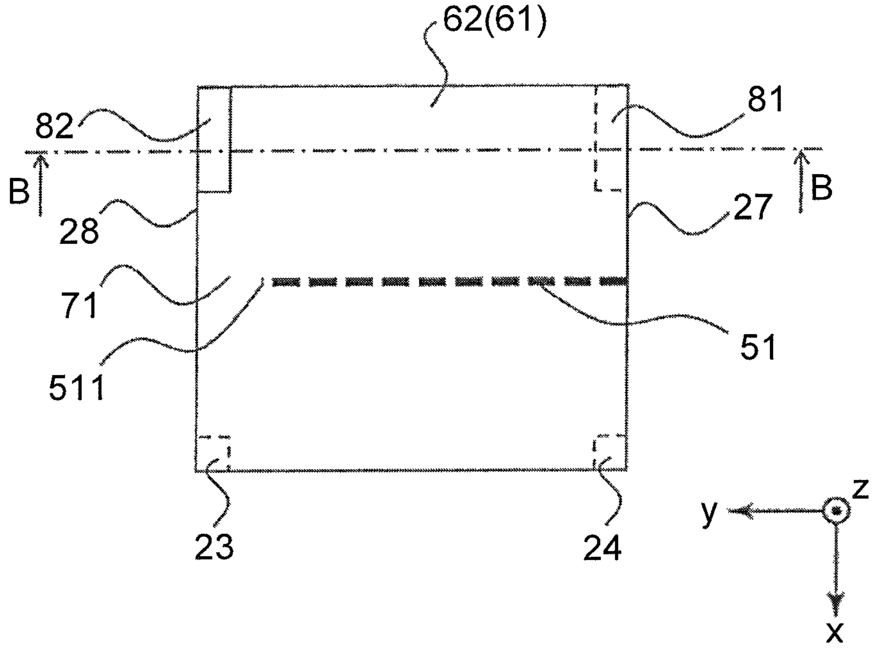
FIG. 5 is a top view schematically illustrating of a second lateral partition as viewed from above.
Figure 6:
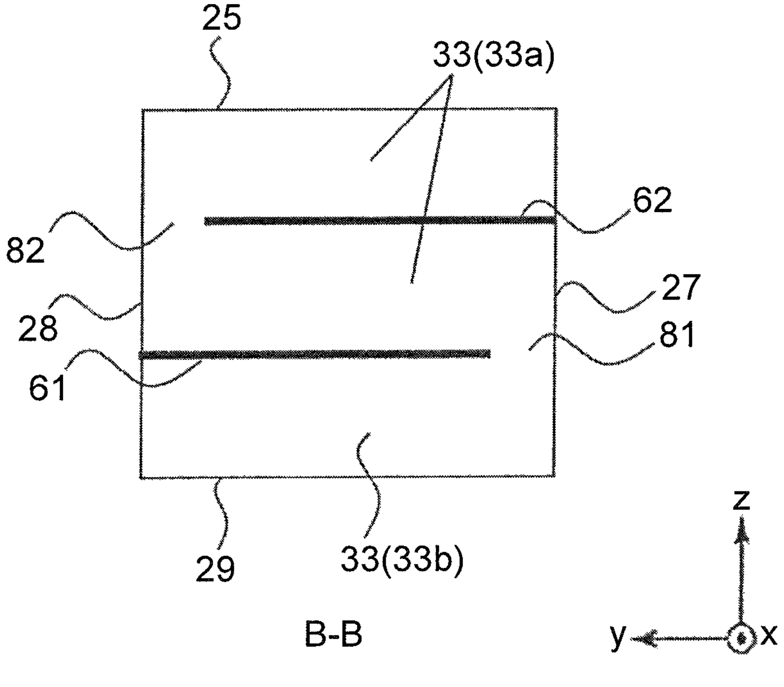
FIG. 6 is a cross-sectional view taken along a line B-B of FIG. 5.

FIG. 5 is a top view schematically illustrating of a second lateral partition 62 (described below) as viewed from above. FIG. 6 is a cross-sectional view taken along a line B-B of FIG. 5.

As illustrated in FIGS. 5 and 6, the second lateral partition 62 extending from the peripheral wall (as an example of a first side wall 27) inward the ink chamber 33 is further provided in the upper ink containing portion 33*a* which is positioned above the first lateral partition 61. A second longitudinal communication passage 82 configured to communicate an upper space and a lower space of the second lateral partition 62 is formed between the second lateral partition 62 and the peripheral wall. The first lateral partition 61 and the second lateral partition 62 are at least partially overlapped each other in a vertical direction (the z-axis direction). As illustrated in FIG. 5, the second longitudinal communication passage 82 is provided not to overlap the first longitudinal communication passage 81 when viewed from above. Thus, the flow path of the ink flowing into the ink outlet port 24 in the ink chamber 33 may further more extend.

In the first modification, the number of the second lateral partition 62 is one, but not limited thereto, and may be two or more. In the case where the number of the second lateral partition 62 is two or more, it is preferable that the two second lateral partition 62 adjacent in an up-down direction (the z-axis direction) are respectively disposed such that the two second longitudinal communication passages 82, each of which is formed between the peripheral wall and the second lateral partition 62, do not overlap each other.

According to the first modification, the same effects as those of the above-described first embodiment can also be achieved.

Second Modification of First Embodiment

Figure 7:
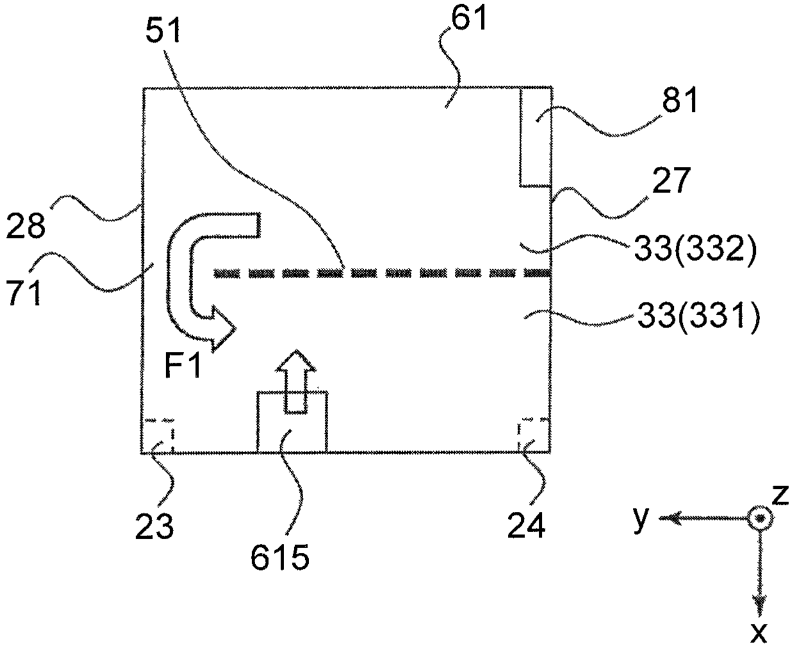
FIG. 7 is a top view schematically illustrating of the first lateral partition as viewed from above.

FIG. 7 is a top view schematically illustrating of the first lateral partition as viewed from above. As illustrated in FIG. 7, the first lateral partition 61 is provided with a notch 615 at a position away from the first longitudinal communication passage 71 in a plan view. Since the notch 615 is provided, when the air discharged from the air supply port 23 is diffused upward, the air bubbles generated at the second side wall 28 may not stay at the lower surface of the first lateral partition 61 and may diffuse upward as early as possible through the notch 615. Further, the notch 615 is provided corresponding to the first ink containing portion 331 in the first lateral partition 61 and is positioned on the upstream side of the ink outlet port 24. Thus, certain amount of the ink above the first lateral partition 61 flows into the second ink containing portion 332 via the first longitudinal communication passage 81, then flows around the first longitudinal partition 51 via the first lateral communication passage 71 as indicated by an arrow F1 into the first ink containing portion 331, and finally flows into the ink outlet port 24. On the other hand, some other amount of the ink above the first lateral partition 61 directly flows into the first ink containing portion 331 via the notch 615 of the first lateral partition 61 as indicated by an arrow F2, and finally flows into the ink outlet port 24. The two ink-flows may cause ink mixed and agitated at an upstream position of the ink outlet port 24 in the first ink containing portion 331 to further uniformize ink concentration, and then flow into the ink outlet port 24.

In the second modification, the notch 615 is provided corresponding to the first ink containing portion 331 in the first lateral partition 61, but not limited thereto, the notch 615 may be provided corresponding to one of the first ink containing portion 331 and the second ink containing portion 332, in which the ink outlet port 24 is provided, in the first lateral partition 61.

According to the second modification, the same effects as those of the above-described first embodiment can also be achieved.

Third Modification of First Embodiment

Figure 8:
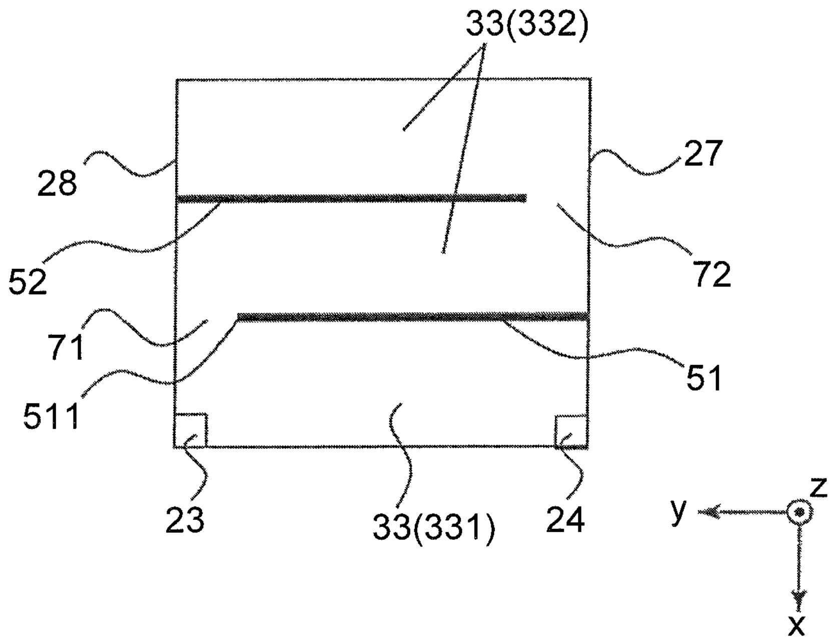
FIG. 8 is a top view schematically illustrating of a first longitudinal partition and a second longitudinal partition as viewed from above.

FIG. 8 is a top view schematically illustrating of a first longitudinal partition and a second longitudinal partition as viewed from above. As illustrated in FIG. 8, the second ink containing portion 332 further includes a second longitudinal partition 52 extending from the lower wall 29 upward. A second lateral communication passage 72 configured to communicate spaces on both sides of the second longitudinal partition 52 in the ink chamber 33 (specifically, the lower ink containing portion 33*b*) is formed between the second longitudinal partition 52 and the peripheral wall (as an example of a first side wall 27 in the third modification). The second longitudinal partition 52 and the first longitudinal partition 51 are arranged in the horizontal direction (specifically, the x-axis direction). The "arrange" herein means that the first longitudinal partition 51 and the second longitudinal partition 52 are arranged with their surfaces facing each other at an acute angle or in parallel. The second lateral communication passage 72 is provided not to overlap the first lateral communication passage 71 when viewed from a direction (the x-axis direction) in which the first longitudinal partition 51 and the second longitudinal partition 52 are arranged. Thus, the length of the flow path of the ink flowing into the ink outlet port 24 in the ink chamber 33 may be further lengthened.

In the third modification, the number of the second longitudinal partition 52 is one, but not limited thereto, and may be two or more. In the case where the number of the second longitudinal partition 52 is two or more, it is preferable that the two second longitudinal partition 52 adjacent in the up-down direction (the z-axis direction) are respectively disposed such that the two second lateral communication passages 72, each of which is formed between the peripheral wall and the second longitudinal partition 52, do not overlap each other.

According to the third modification, the same effects as those of the above-described first embodiment can also be achieved.

Second Embodiment

Hereinafter, the second embodiment will be described. In the second embodiment, the same components as those in the first embodiment are denoted by the same reference numerals and the description thereof will not be repeated.

Figure 9:
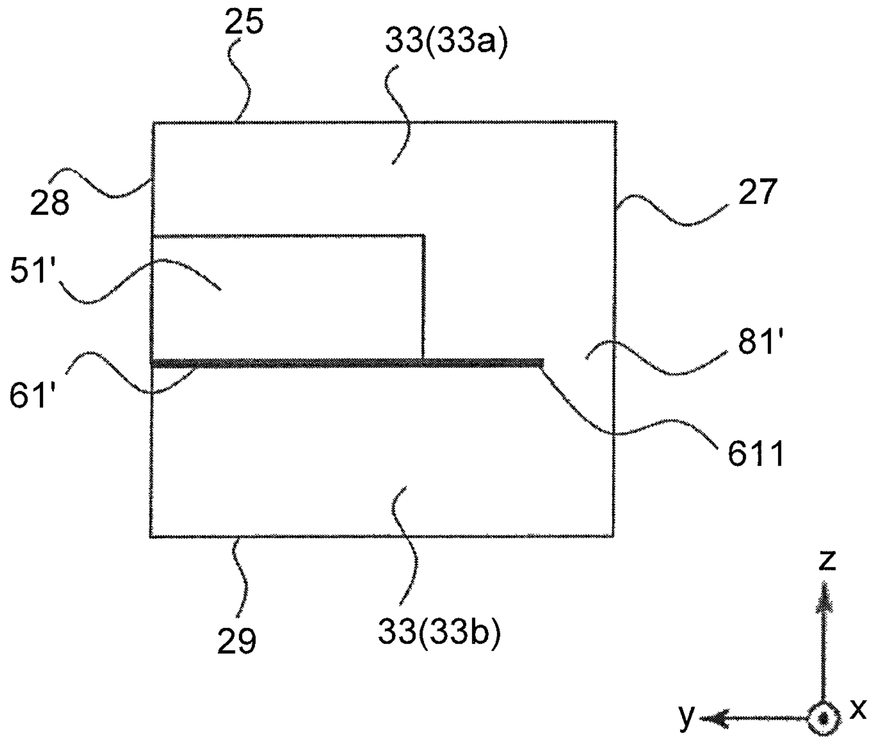
FIG. 9 is a cross-sectional view illustrating an internal structure of the ink chamber in a second embodiment of the disclosure at the same angle of view as FIG. 4.

FIG. 9 is a cross-sectional view illustrating an internal structure of the ink chamber in the second embodiment of the disclosure at the same angle of view as FIG. 4. A lateral partition 61' extends from the peripheral wall (specifically, the second side wall 28) into the ink chamber 33 and partitions the ink chamber 33 into the upper ink containing portion 33*a* and the lower ink containing portion 33*b* in the up-down direction (the z-axis direction). A longitudinal partition 51' extends upward from the lateral partition 61' and partitions the ink chamber 33 (specifically, the upper ink containing portion 33*a*) in the horizontal direction (the x-axis direction). A longitudinal communication passage 81' is formed between the lateral partition 61' and the peripheral wall (specifically, the first side wall 27). A lateral communication passage is formed between the longitudinal partition 51' and the peripheral wall, and is formed at a portion of the lateral partition 61', which is away from one end portion 611 of the lateral partition 61'. The one end portion 611 is an end portion defining the longitudinal communication passage 81'.

According to the second embodiment, the same effects as those of the above-described first embodiment can also be achieved.

Third Embodiment

Hereinafter, the third embodiment will be described. In the third embodiment, the same components as those in the first embodiment are denoted by the same reference numerals and the description thereof will not be repeated.

Figure 10:
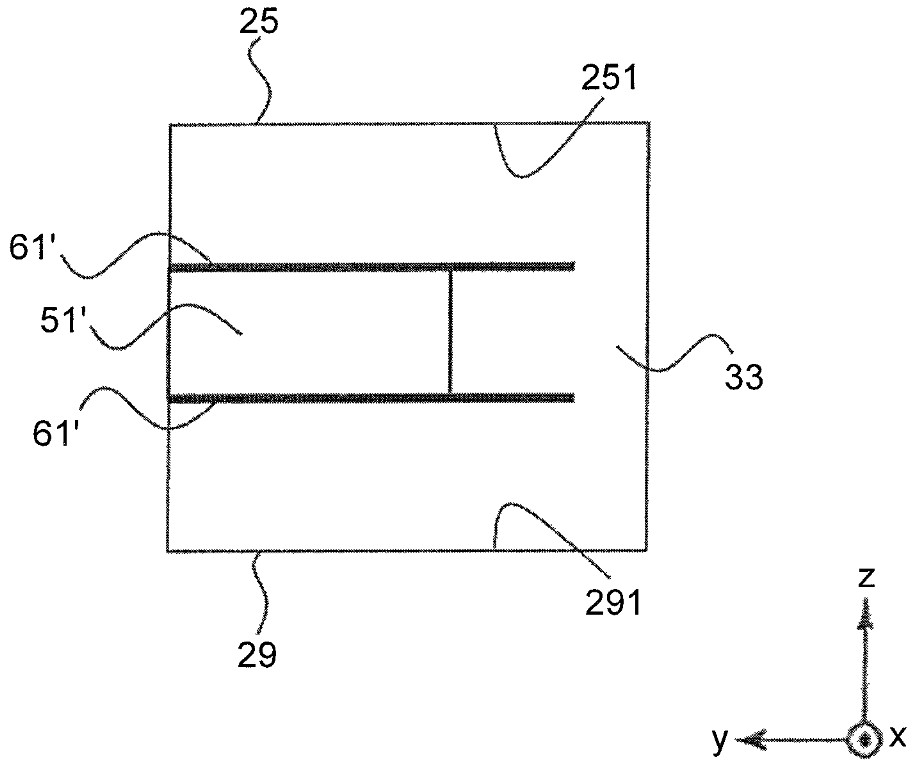
FIG. 10 is a cross-sectional view illustrating an internal structure of the ink chamber in a third embodiment of the disclosure at the same angle of view as FIG. 9.

FIG. 10 is a cross-sectional view illustrating an internal structure of the ink chamber in the third embodiment of the disclosure at the same angle of view as FIG. 9. In FIG. 10, two lateral partitions 61', i.e., an upper lateral partition and a lower lateral partition, are shown, the longitudinal partition 51' extends from a first lateral surface and is connected to a second lateral surface. The longitudinal partition 51' partitions the ink chamber 33 in the horizontal direction (specifically, the x-axis direction). In the third embodiment, the first lateral surface is an upper surface of the lower lateral partition 61', and the second lateral surface is a lower surface of the upper lateral partition 61'. In the case where three or more lateral partitions 61' are provided in the ink chamber 33, the longitudinal partitions 51' may be provided between the two lateral partitions 61' adjacent in the vertical direction (the z-axis direction).

Further, the first lateral surface may also be an upper surface 291 of the lower wall 29, and the second lateral surface may also be a lower surface 251 of the upper wall 25.

According to the third embodiment, the same effects as those of the above-described first embodiment can also be achieved.

Fourth Embodiment

Hereinafter, the fourth embodiment will be described. In the fourth embodiment, the same components as those in the first embodiment are denoted by the same reference numerals and the description thereof will not be repeated.

Figure 11:
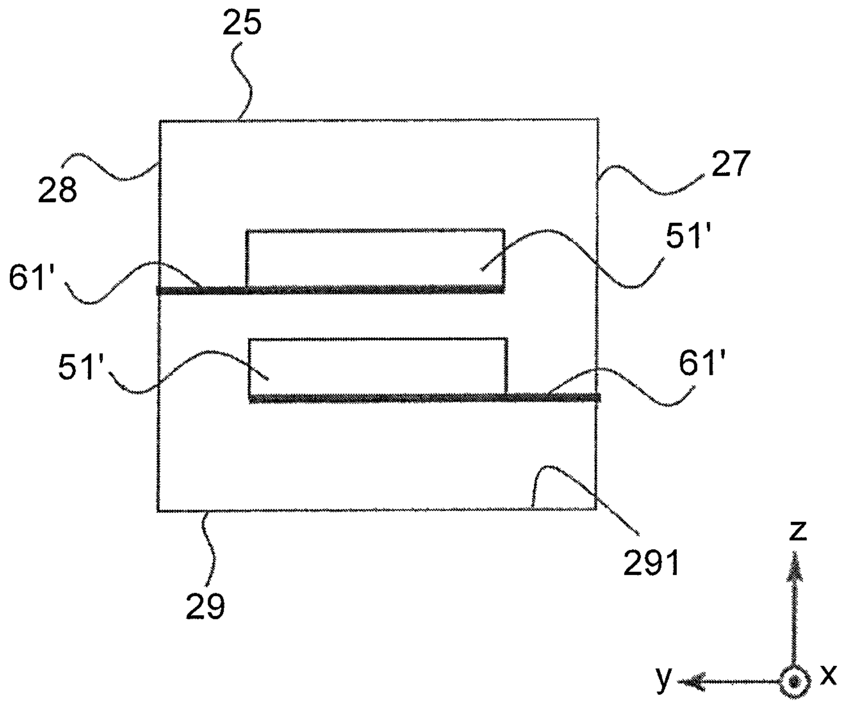
FIG. 11 is a cross-sectional view illustrating an internal structure of the ink chamber in a fourth embodiment of the disclosure at the same angle of view as FIG. 10.

FIG. 11 is a cross-sectional view illustrating an internal structure of the ink chamber in the fourth embodiment of the disclosure at the same angle of view as FIG. 10. A longitudinal partition 51' extends upward from a lateral surface with the ink tank 15. The longitudinal partition 51' partitions the ink chamber 33 in the horizontal direction (specifically, the x-axis direction). The longitudinal partition 51' is separated from the first side wall 27 and the second side wall 28 (i.e., the peripheral wall). In the fourth embodiment, the lateral surface is an upper surface of the lateral partition 61'. The longitudinal partition 51' extends upward from at least one of the upper surfaces (i.e., lateral surfaces) of the lateral partitions 61'. The longitudinal partition 51' may extend upward from each lateral surface 61' as shown in FIG. 11. Further, the lateral surface may also be the upper surface 291 of the lower wall 29.

According to the fourth embodiment, the same effects as those of the above-described first embodiment can also be achieved.

In the fourth embodiment of FIG. 11, the longitudinal partition 51' extends in a direction perpendicular to the first side wall 27 and the second side wall 28 (i.e., the y-axis direction), but not limited thereto. The longitudinal partition 51' may also extend in a direction parallel to the first side wall 27 and the second side wall 28 (i.e., the x-axis direction), and may also extend in a direction in which is neither parallel nor perpendicular to the first side wall 27 and the second side wall 28 to form a certain angle (an acute angle or an obtuse angle).

Further, in the above-described respective embodiments and modifications, various changes, arrangements and modifications may be applied therein without departing from the spirit and scope of the disclosure, and the respective embodiments may be appropriately combined or partially combined with each other.

What is claimed is:

1. A liquid container comprising:

a liquid chamber configured to contain liquid and including an upper liquid containing portion and a lower liquid containing portion positioned lower than the upper liquid containing portion, a communication hole being formed to communicate between the upper liquid containing portion and the lower liquid containing portion;

a wall portion positioned in the lower liquid containing portion and extending upward;

a lateral partition configured to partition the liquid chamber into the upper liquid containing portion and the lower liquid containing portion;

a liquid outlet port positioned opposite to the communication hole with respect to the wall portion in the lower liquid containing portion; and a liquid inlet port positioned in an upper portion of the liquid chamber, the liquid inlet port facing directly upward, wherein when viewed from above, a virtual line connecting the communication hole and the liquid outlet port intersects with the wall portion, and wherein the ink entering through the liquid inlet port first falls onto the lateral partition, flows horizontally on the lateral partition in the upper liquid containing portion to the communication hole, then passes through the communication hole to the lower liquid containing portion.

2. The liquid container according to claim 1, wherein the liquid chamber is defined by at least an upper wall, a lower wall, a first side wall and a second side wall, and wherein the wall portion extends vertically upward from the lower wall.

3. The liquid container according to claim 2, wherein the liquid chamber is defined by at least an upper wall, a lower wall, a first side wall and a second side wall, and wherein the wall portion extends from the second side wall.

4. The liquid container according to claim 3, wherein the wall portion does not extend to the first side wall.

5. The liquid container according to claim 3, wherein the wall portion extends from the second side wall perpendicularly to the second side wall.

6. The liquid container according to claim 1, wherein the liquid chamber is defined by at least an upper wall, a lower wall, a first side wall and a second side wall, and wherein the wall portion extends from the second side wall.

7. The liquid container according to claim 6, wherein the wall portion does not extend to the first side wall.

8. The liquid container according to claim 6, wherein the wall portion extends from the second side wall perpendicularly to the second side wall.

9. The liquid container according to claim 1, wherein the liquid chamber is defined by at least an upper wall, a lower wall, a first side wall and a second side wall, and wherein the communication hole is positioned closer to the second side wall.

10. The liquid container according to claim 1, wherein the liquid chamber is defined by at least an upper wall, a lower wall, a first side wall and a second side wall, and wherein the liquid outlet port is positioned closer to the second side wall.

11. The liquid container according to claim 1, wherein after liquid flows from the upper liquid containing portion through the communication hole to the lower liquid containing portion, the liquid flows while colliding with the wall portion and is supplied to the outside through the liquid outlet port.

12. The liquid container according to claim 1, further comprising:

a buffer chamber disposed below the liquid chamber; and an air supply port which communicates with the buffer chamber and through which air is supplied from the buffer chamber to the liquid chamber.

13. A liquid container comprising:

a liquid chamber configured to contain liquid and including an upper liquid containing portion and a lower liquid containing portion positioned lower than the upper liquid containing portion, a communication hole being formed to communicate between the upper liquid containing portion and the lower liquid containing portion;

a wall portion positioned in the lower liquid containing portion and extending upward;

a lateral partition configured to partition the liquid chamber into the upper liquid containing portion and the lower liquid containing portion;

a liquid outlet port positioned opposite to the communication hole with respect to the wall portion in the lower liquid containing portion; and a liquid inlet port positioned in an upper portion of the liquid chamber, the liquid inlet port facing directly upward, wherein when viewed from above, a surface of the wall portion faces the communication hole, and wherein the ink entering through the liquid inlet port first falls onto the lateral partition, flows horizontally on the lateral partition in the upper liquid containing portion to the communication hole, then passes through the communication hole to the lower liquid containing portion.

* * * * *